United States Patent
Yang et al.

(10) Patent No.: US 7,907,627 B2
(45) Date of Patent: Mar. 15, 2011

(54) WIRELESS COMMUNICATION METHOD FOLLOWING DCF RULE

(75) Inventors: Chil-youl Yang, Yongin-si (KR);
Chang-yeul Kwon, Seongnam-si (KR);
Tae-kon Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1159 days.

(21) Appl. No.: 11/028,067

(22) Filed: Jan. 4, 2005

(65) Prior Publication Data

US 2005/0157747 A1 Jul. 21, 2005

(30) Foreign Application Priority Data

Jan. 19, 2004 (KR) .................... 10-2004-0003977

(51) Int. Cl.
*H04L 12/413* (2006.01)
(52) U.S. Cl. ............................ 370/445; 370/447
(58) Field of Classification Search .............. 370/465, 370/229, 235, 231, 470, 445, 448, 447, 450, 370/454, 456, 458, 459, 461, 349, 455, 453
See application file for complete search history.

(56) References Cited

U.S. PATENT DOCUMENTS

| | | | |
|---|---|---|---|
| 5,422,887 A | 6/1995 | Diepstraten et al. | |
| 6,567,413 B1 * | 5/2003 | Denton et al. | 370/401 |
| 6,990,116 B1 * | 1/2006 | Young et al. | 370/445 |
| 7,046,650 B2 * | 5/2006 | Sherman | 370/338 |
| 7,046,690 B2 * | 5/2006 | Sherman | 370/445 |
| 7,058,074 B2 * | 6/2006 | Ho et al. | 370/447 |
| 2002/0120740 A1 * | 8/2002 | Ho et al. | 709/225 |
| 2003/0161340 A1 * | 8/2003 | Sherman | 370/445 |
| 2003/0219001 A1 | 11/2003 | de Prado Pavon et al. | |
| 2004/0022219 A1 * | 2/2004 | Mangold et al. | 370/336 |
| 2004/0156351 A1 * | 8/2004 | Kim | 370/349 |
| 2005/0025131 A1 | 2/2005 | Ko et al. | |
| 2005/0090240 A1 * | 4/2005 | Chinitz et al. | 455/418 |
| 2005/0138199 A1 * | 6/2005 | Li et al. | 709/236 |
| 2006/0114826 A1 * | 6/2006 | Brommer | 370/230 |

FOREIGN PATENT DOCUMENTS

| | | |
|---|---|---|
| JP | 8-181705 A | 7/1996 |
| KR | 2001-0050666 A | 6/2001 |
| KR | 20050013872 A | 2/2005 |
| WO | WO 02/41590 A1 | 5/2002 |

OTHER PUBLICATIONS

Notice of Allowance dated Nov. 27, 2009 issued by the Korean Intellectual Property Office in counterpart application No. 10-2004-0003977.

* cited by examiner

*Primary Examiner* — Brenda Pham
(74) *Attorney, Agent, or Firm* — Sughrue Mion, PLLC

(57) ABSTRACT

Provided are a method and apparatus which can reduce the possibility of collision with other frames when transmitting a broadcast/multicast frame in a wireless local area network (LAN) following a Distributed Coordination Function (DCF) rule, thereby ensuring reliable transmission. The wireless communication method for sending or receiving a predetermined frame through contention between an access point and one or more stations according to DCF is characterized in that the access point uses the shortest of interframe space (IFS) intervals for access to a wireless medium. Therefore, when wireless LAN STAs operate in a DCF mode, the possibility of collision during broadcast or multicast frame transmission can be reduced while adopting conventional CSMA/CA mechanism, thereby improving reliability in successful frame transmission.

6 Claims, 6 Drawing Sheets

WIRELESS COMMUNICATION METHOD FOLLOWING DCF RULE

CROSS-REFERENCE TO RELATED APPLICATION

This application claims priority from Korean Patent Application No. 10-2004-0003977, filed on Jan. 19, 2004 in the Korean Intellectual Property Office, the disclosure of which is incorporated herein in its entirety by reference.

BACKGROUND OF THE INVENTION

1. Field of the Invention

The present invention relates to a method for efficiently transmitting data over a wireless local area network (LAN), and more particularly, to a method and apparatus for reducing the possibility of collision with other frames and ensuring reliable transmission when transmitting a broadcast/multicast frame in a wireless LAN following a Distributed Coordination Function (DCF) access scheme.

2. Description of the Related Art

As improvement in data transfer rate is of paramount concern in a wireless LAN, a Media Access Control (MAC) sublayer responsible for access control has become increasingly important. However, since both the IEEE 802.11a standard and the IEEE 802.11b standard use a MAC defined in the IEEE 802.11 standard, frequent collisions in the channel access may unavoidably degrade the performance of an overall system in spite of improved data rate. Thus, if occurrence of collisions can be suppressed and errors of a colliding packet can be quickly recovered, the system performance will be significantly improved.

DCF and Point Coordination Function (PCF) are defined in a 802.11 MAC for medium access. The DCF is a basic access mechanism defined in the IEEE 802.11 MAC standard, which provides contention-based medium access services and uses a backoff algorithm for medium access.

In DCF mode, DCF InterFrame Space (DIFS) is a period of time for which a station (STA) must wait to use a medium. If a backoff timer contains a non-zero value after a DIFS period for which the medium remains idle, STAs generate a random backoff time for an additional delay time before transmission. The backoff algorithm is used to minimize collision that occurs when multiple STAs contend for access to the medium for data transmission. An example of the backoff algorithm is given by Equation (1):

$$\text{Backoff Time} = \text{Random}(\ ) \times a\text{SlotTime} \quad (1)$$

where Random( ) is a uniform pseudo random integer, and aSlotTime is one of management information base (MIB) values.

In general, when a STA is operating according to the DCF access mechanism, the STA will transmit a pending MAC Protocol Data Unit (MPDU) if the medium is idle for more than a DIFS period. If carrier sense mechanism determines that the medium is idle under these conditions, a contention window (CW) size is changed by a backoff algorithm. When there is not enough time to transmit or retransmit MPDU and acknowledgement (ACK), the STA may defer this transmission or retransmission by a selected random backoff time.

FIG. 1 illustrates a contention-based access method using DCF. In the IEEE 802.11 DCF mode, Carrier Sense Multi Access/Collision Avoidance (CSMA/CA) is used to access a medium. Of the carrier sense methods, a physical carrier sense mechanism is provided by a physical layer (PHY). For more information, see the 802.11 PHY specifications. A virtual carrier sense mechanism is provided by a MAC layer and uses a Network Allocation Vector (NAV) that is used as a counter at each STA indicating when a channel is idle based on a 'duration field' in a frame. A procedure for transmitting a frame according to the CSMA/CA method is as follows: first, a CSMA/CA mechanism determines current status of a medium. If the medium is idle for greater than or equal to a DIFS period, transmission of a frame begins immediately. If the medium is busy, the STA waits until the medium remains idle. If the medium is idle, the STA defers its transmission for DIFS, and if the medium still remains idle for longer than the DIFS period, the STA selects a random backoff time in the range between 0 and a given CW and backs off for the selected backoff time by aSlotTime. If the medium is still idle after the random backoff interval has expired, the STA will begin transmission of the frame.

Four different Interframe Space (IFS) intervals, the time intervals between frames, are defined to provide priority levels for access to wireless media: Short IFS (SIFS), PCF IFS (PIFS), DCF IFS (DIFS), and Extended IFS (EIFS). The relationship between the different IFS intervals is illustrated in FIG. 1. SIFS, the shortest of IFS intervals, is used for an ACK frame, a Clear to Send (CTS) frame, a continuing fragmented frame and a frame sent during a contention free period (CFP). While PIFS is used by only STAs operating under PCF at the start of CFP, DIFS is used by STAs operating under DCF mode to transmit MPDUs and MAC Management Protocol Data Units (MMPDUs). EIFS is used by DCF-based stations when PHY has notified that a frame transmission resulted in a bad reception of the frame due to an incorrect Frame Check Sequence (FCS) value.

FIG. 2 illustrates three conventional unicast frame transmission cases 1-3. Referring to FIG. 2, in case 1 where transmission has been successful, an ACK is received a SIFS interval after transmission of frame 1, and then a backoff algorithm is performed after a DIFS interval before transmission of frame 2.

In case 2 where an ACK has not been received after frame transmission, if ACK is not received within an ACK timeout period after transmission of frame 1, the frame 1 is repeatedly retransmitted after an additional random backoff time, within the maximum retry count, until the transmission is successful, thereby increasing transmission reliability. In the case 2 where the ACK has not been received, a CW value is increased from the original value during the backoff procedure. For example, if CW is 15 during the first backoff, CW increases in the range of 15 to 1023 during the additional backoff after collisions, thereby reducing the probability of collision. This is because, assuming that two STAs exist, the probability of the two STAs colliding during a backoff procedure is 1/CW.

In case 3 where collision has occurred during receipt of an ACK frame after transmission, a backoff procedure is performed after a DIFS or EIFS interval, and frame 1 is retransmitted depending on the status of the ACK frame after an ACK timeout period, thereby reducing the possibility of collision. In the case of unicast frame transmission described above, retransmission of a frame is determined depending on the receipt of ACK, thereby ensuring reliable frame transmission.

FIG. 3 illustrates two conventional broadcast (BC) frame transmission cases 4 and 5. The same is true when a multicast frame is used instead of the BC frame. Referring to FIG. 3, in case 4 where transmission is successful, a backoff procedure is performed after a DIFS interval after BC frame 1 has been transmitted, without receipt of an ACK, and then BC frame 2 is transmitted. In case 5 where transmission has failed due to collision, even when BC frame 1 fails to be transmitted due to collision, a backoff process is performed after the DIFS interval, and then BC frame 2 is transmitted instead of having to retransmit the BC frame 1 as shown in the case 4. Since it is impossible to retransmit frames after the collision, and CW is fixed to a previous value, i.e., Cwmin=15, during the additional backoff procedure after collision, these conventional transmission still have the possibility of collision under the same environment.

As illustrated in FIG. 2, the DCF mode defined in the IEEE 802.11 standard uses a collision avoidance mechanism known as a random backoff to access a medium. Unlike a collision detection mechanism, the collision avoidance mechanism determines whether transmission is successful by the receipt of an ACK corresponding to the transmitted frame. However, as shown in FIG. 3, in the conventional transmission, there is no way to sense or recover from a collision during data transmission due to the absence of an ACK responding to broadcast/multicast data transmission. Thus, the conventional method has a high possibility of collision between different STAs during data transmission, thereby significantly degrading the stability of a wireless network.

SUMMARY OF THE INVENTION

The present invention provides a collision prevention technique for a broadcast or multicast frame that is not defined in the IEEE 802.11 Wireless LAN MAC standard, thereby enhancing reliability in a wireless network environment.

The present invention also provides a method that allows the collision prevention technique to be employed for all stations operating in a DCF mode, regardless of whether the stations use either an infrastructure mode or an ad-hoc mode.

According to an exemplary embodiment of the present invention, there is provided a wireless communication method for sending or receiving a predetermined frame through contention between an access point and one or more stations according to a distributed coordination function (DCF), wherein the access point uses the shortest of interframe space (IFS) intervals for access to a wireless medium.

The IFS intervals for access to the wireless medium may include short IFS (SIFS), Point Coordination Function IFS (PIFS), DCF IFS (DIFS) and Extended IFS (EIFS), and the access point and one or more devices use SIFS and DIFS, respectively.

Alternatively, the IFS intervals for access to the wireless medium may include short IFS (SIFS), Point Coordination Function IFS (PIFS), DCF IFS (DIFS) and Extended IFS (EIFS), and the access point and one or more devices use PIFS and DIFS, respectively.

The access point preferably transmits predetermined frame information without a backoff procedure after a predetermined IFS interval.

According to another exemplary embodiment of the present invention, there is provided a method for sending or receiving predetermined frame information through a contention among one or more stations according to a distributed coordination function (DCF) comprising: sending a clear to send (CTS) frame specifying a station that wins the contention through a backoff window as the destination; and sending a frame having two or more destinations an interframe space (IFS) interval, which is shorter than DCF IFS (DIFS), after transmission of the CTS frame when no collision occurs during transmission of the CTS frame.

The method may further comprise, when a medium become busy due to the collision during transmission of the CTS frame, sending the frame having two or more destinations after a slot time following the busy condition.

The method may also further comprise, when a medium becomes busy due to the collision during transmission of the CTS frame, sending the frame having two or more destinations after a short IFS (SIFS) following the busy condition.

The frame having two or more destinations is preferably a broadcast or multicast frame.

The IFS, which is shorter than DCF, is preferably a PCF interframe space (PIFS).

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF ILLUSTRATIVE, NON-LIMITING EMBODIMENTS OF THE INVENTION

Figure 1:
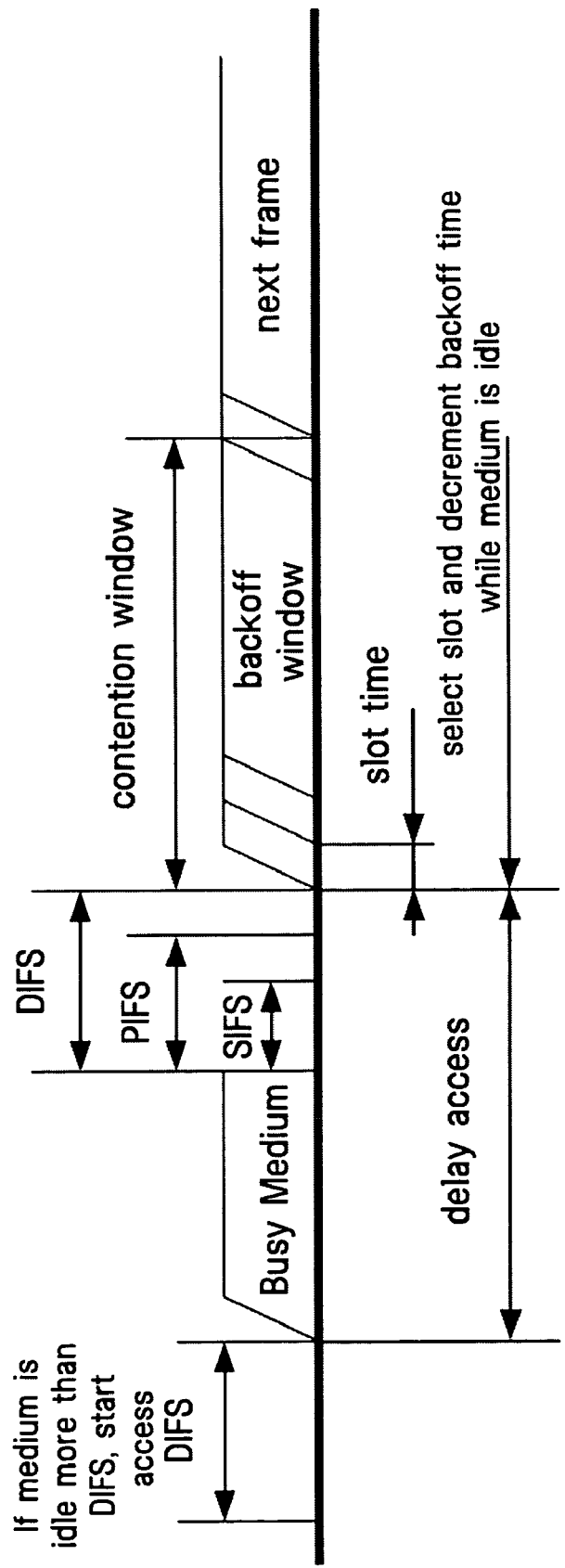
FIG. 1 illustrates a contention-based access method using DCF.
Figure 2:
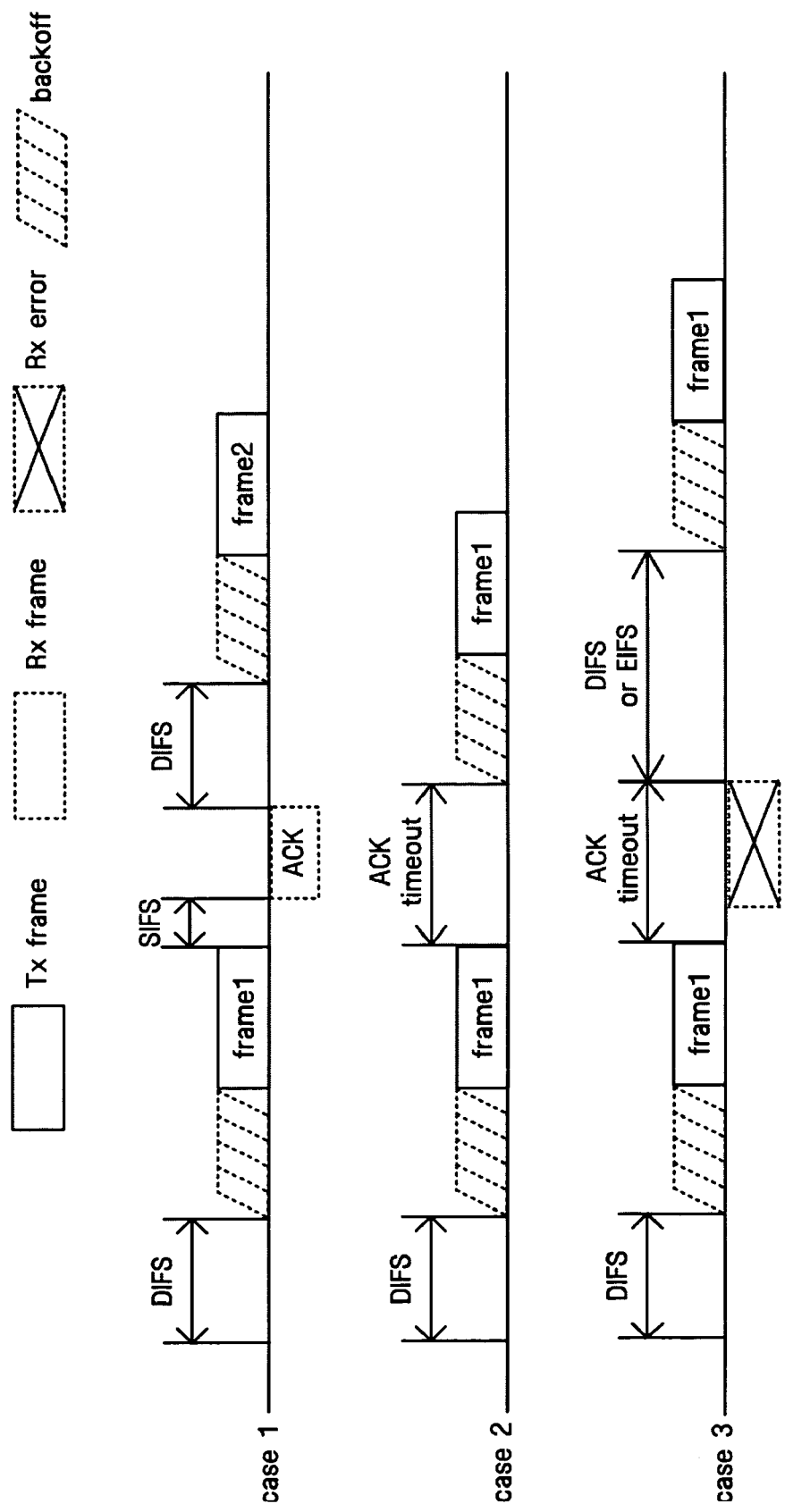
FIG. 2 illustrates conventional unicast frame transmission.
Figure 3:
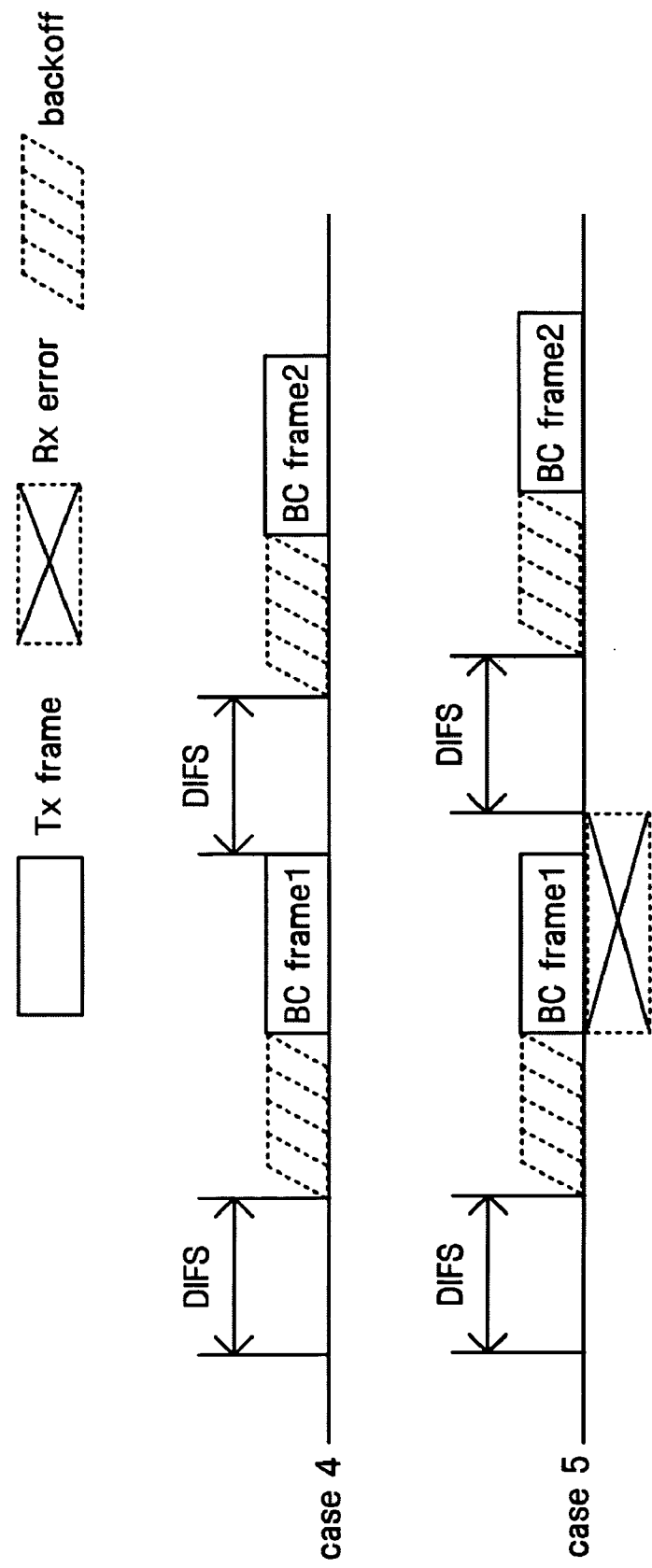
FIG. 3 illustrates conventional broadcast/multicast frame transmission.

The present invention will now be described more fully with reference to the accompanying drawings, in which exemplary embodiments of the invention are shown. This invention may, however, be embodied in many different forms and should not be construed as being limited to the exemplary embodiments set forth herein. Rather, these exemplary embodiments are provided so that this disclosure will be thorough and complete, and will fully convey the concept of the invention to those skilled in the art. In the drawings, the same reference numerals represent the same elements.

Figure 4:
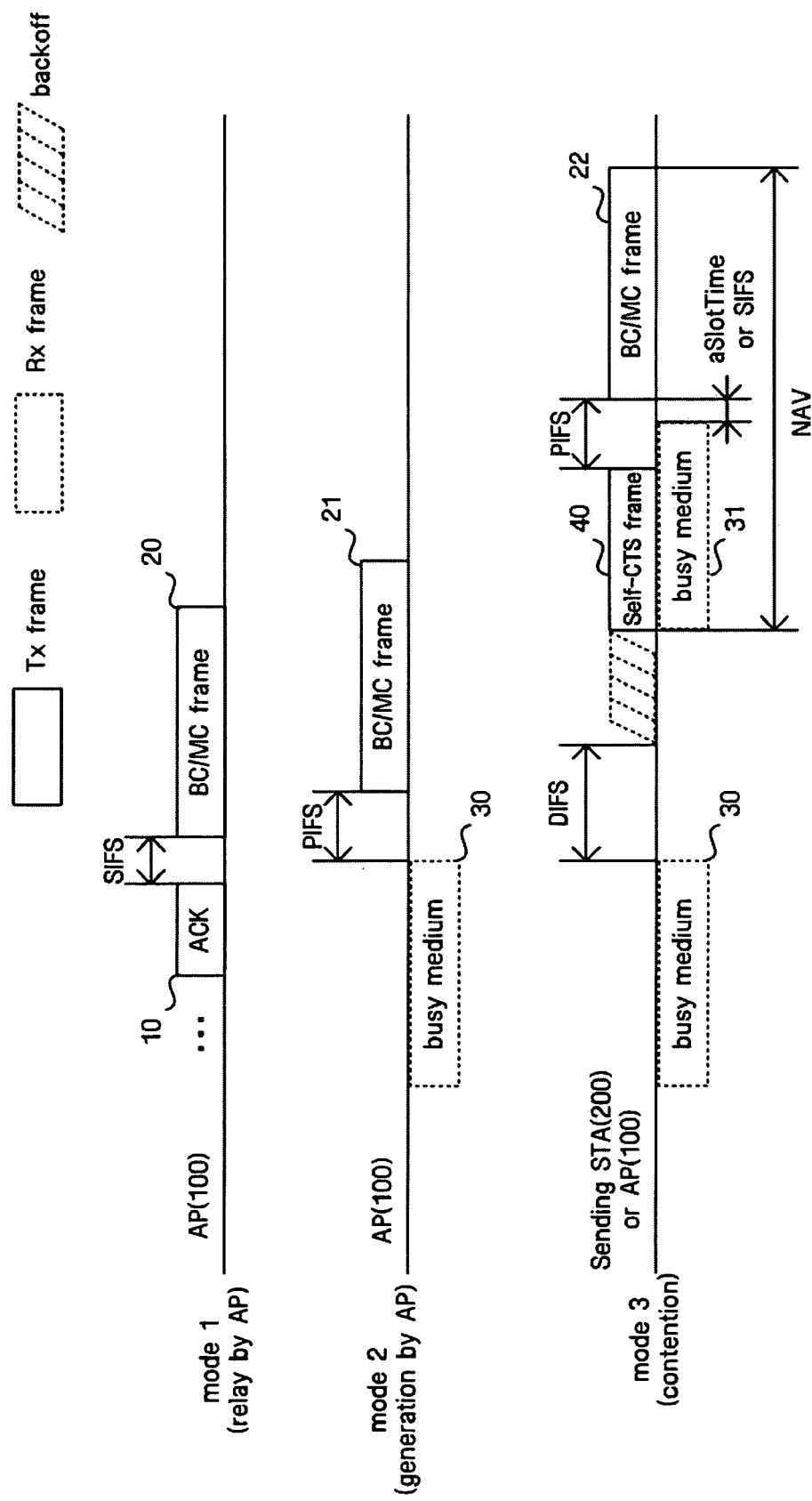
FIG. 4 illustrates three transmission modes according to an exemplary embodiment of the present invention.

Referring to FIG. 4, in mode 1, an access point (AP) 100 relays a frame received from a sending station. According to the conventional IEEE 802.11 standard, after the AP 100 has received a broadcast (BC)/multicast (MC) frame 20 and sent a corresponding ACK frame 10, a backoff algorithm must be performed after a Distributed Coordination Function Interframe Space (DIFS) interval to contend for a medium before the BC/MC frame 20 is sent (relayed) to other STAs. This conventional method may cause the BC/MC frame 20 sent by the AP 100 to collide with other frames, and if a collision occurs, it has no way to recover from the collision. To overcome these problems, according to the present invention, in the transmission mode 1, the AP 100 waits a Short IFS (SIFS) interval instead of DIFS after having received the ACK 10, and immediately transmits the BC/MC frame 20. In this case, the SIFS is the shortest time taken from the end of data transmission to the beginning of next data transmission. Then, the AP 100 has the highest priority in a contention over other STAs 300 that wait a DIFS interval to ensure that the BC/MC frame 20 be sent to the sending STA before others without collision.

Figure 5:
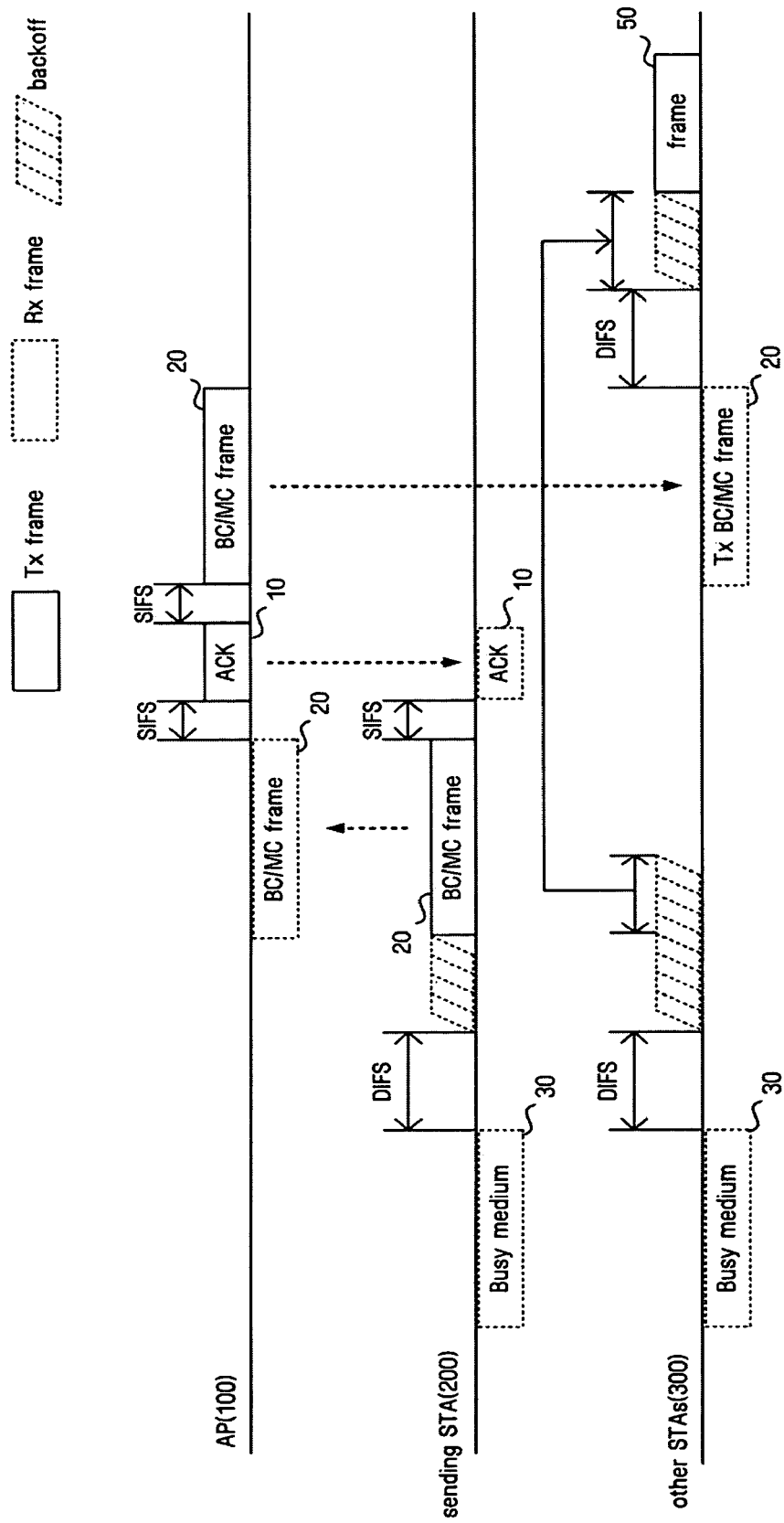
FIG. 5 illustrates the mode 1 according to an exemplary embodiment of the present invention.

Mode 1 will now be described in more detail with reference to FIG. 5. Referring to FIG. 5, if a busy medium 30 is detected between the sending STA 200 and other STAs 300, all STAs perform a backoff algorithm after a DIFS interval. When the sending STA 200 wins a contention for access, it sets a flag 'ToDS' to send the BC/MC frame 20 to the AC 100, which, in turn, transmits the corresponding ACK frame 10 to the sending STA 200 after a SIFS interval.

The AP 100 then broadcasts or multicasts the BC/MC frame 20 to the other STAs 300 immediately after waiting for the SIFS interval instead of DIFS. If the other STAs have their respective unicast frames to be transmitted, they wait for the remaining backoff time before transmitting the unicast frames.

In this case, the result is not affected when the AP 100 transmits the BC/MC frame 20 a PIFS interval after the receipt of the ACK frame 10. This is because the PCFS can be used by only an AP in polling each station for data in a PCF mode. However, since SIFS has been used between the AP 100 receiving the BC/MC frame 20 and sending the following ACK frame 10, the SIFS is also used between sending the ACK frame 10 to the sending STA 10 and broadcasting (or multicasting) the BC/MC frame 20 to the other STAs 300 in order to maintain consistency across the mode 1.

Turning to FIG. 4, in mode 2, the AP 100 itself attempts to transmit a BC/MC frame 21. According to the conventional IEEE 802.11 standard, when a wireless medium is in use, a backoff procedure is performed a DIFS interval after the medium becomes idle following a condition of the busy medium 30. Then, the AP 100 that wins a contention for the medium transmits the BC/MC frame 21. Thus, when a collision occurs, it is impossible to retransmit the BC/MC frame 21. In contrast to the conventional method, the present invention allows the AP 100 to transmit the BC/MC frame 21 immediately after a PIFS interval following a condition of the busy medium 30. Since the PIFS can be used only by the AP 100, this ensures that the AP 100 has the highest priority in sending the BC/MC frame 21 before other frames. In this case, the AP 100 may transmit the BC/MC frame 21 after a SIFS interval.

In FIG. 4, mode 3 indicates the case where the AP 100 or the sending STA 200 stably transmits a BC/MC frame 22 using a self-Clear to Send (CTS) frame 40. If a medium is in use so a busy medium 30 is detected, a contention process is performed using a backoff algorithm after a DIFS interval following the condition of the busy medium 30 and the Self-CTS frame 40 proposed by the invention is transmitted before the BC/MC frame 22. The format of Self-CTS frame 40 is the same as that of a typical CTS frame except that only a 'destination address' is specified to be the address of a sending STA and the Self-CTS frame 40 is not transmitted without receiving a Ready to Send (RTS) frame. The BC/MC frame 22 is transmitted a PIFS (or SIFS) interval after transmission of the Self-CTS frame 40. In this case, transmission period of the Self-CTS frame 40 plus PIFS (or SIFS) plus transmission period of the BC/MC frame 22 may be set to a network allocation vector (NAV) value. If collision occurs during transmission of the Self-CTS frame 40 so a busy medium 31 is sensed, the BC/MC frame 22 is transmitted immediately after waiting for aSlotTime or SIFS following a condition of the busy medium 31.

Figure 6:
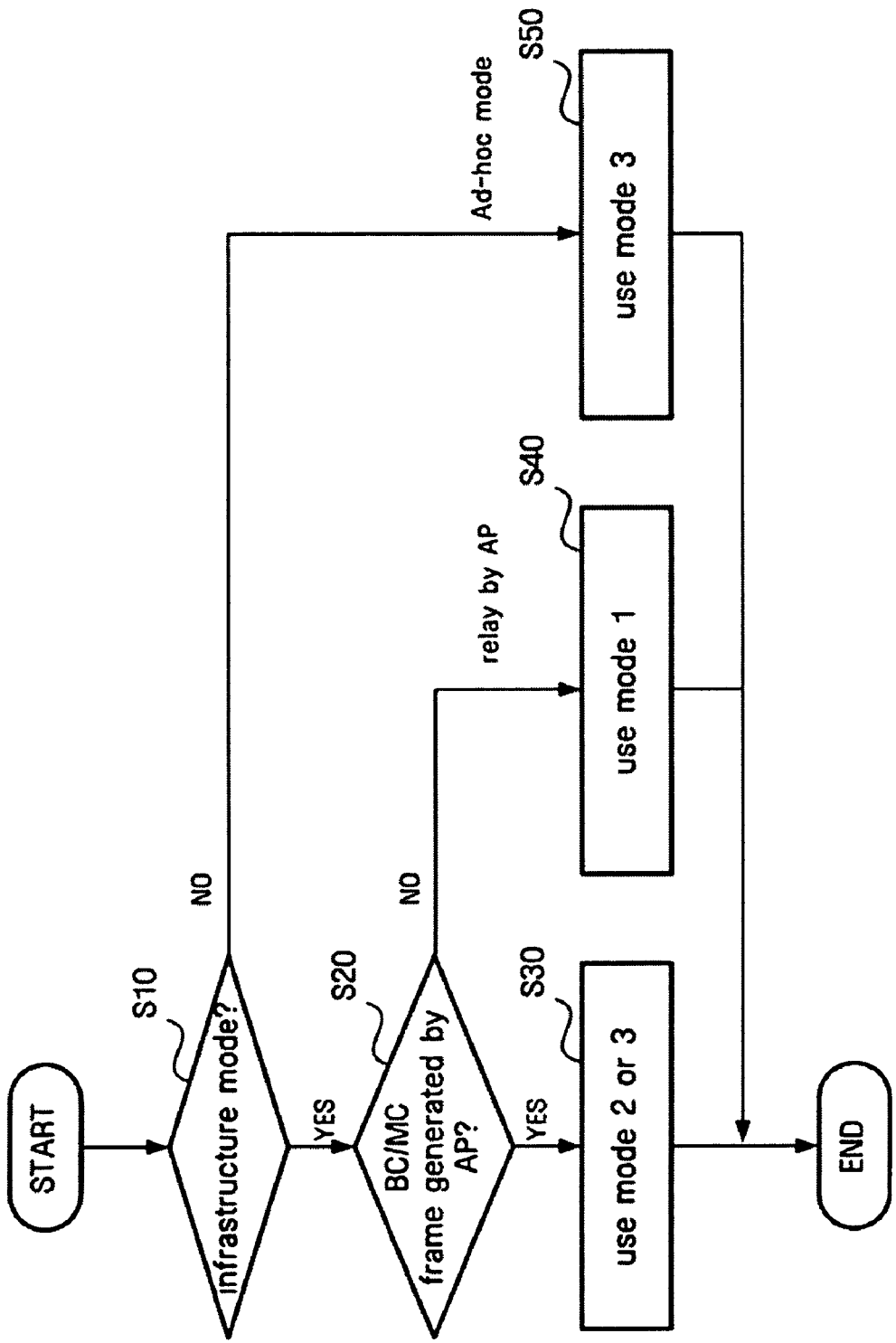
FIG. 6 is a flowchart illustrating an overall transmission process considering all conditions shown in FIGS. 4 and 5.

FIG. 6 is a flowchart illustrating an overall transmission process when all conditions shown in FIGS. 4 and 5 are considered.

Referring to FIG. 6, in step S40, it is preferable to use the mode 1 when in an infrastructure mode (Yes in step S10), the AP 100 that receives the BC/MC frame 20 from the sending STA 200 relays the BC/MC frame 20 and then broadcasts (or multicasts) the same to other STAs 300 (No in step S20).

While it is desirable to use the mode 2 when in the infrastructure mode (Yes in the step S10) the BC/MC frame 21 generated directly by the AP 100 is sent to other STAs 300 (Yes in the step S20), the mode 3 may also be used when the AP 100 uses Carrier Sense Multi Access/Collision Avoidance (CSMA/CA) as access mechanism (step S30).

For the sending STA 200 to transmit the BC/MC frame 22 to the other STAs 300, the mode 3 is used to transmit the BC/MC frame 22 according to a CSMA/CA protocol in step S50.

Also, the present invention enables the possibility of collision between the broadcast or multicast frames to be reduced so that the possibility of collision among other STAs that have transmitted unicast frames can be reduced, thereby decreasing the number of inefficient tries of retransmission.

Although the present invention has been fully described in connection with the exemplary embodiments thereof with reference to the accompanying drawings, it is to be noted that various changes and modifications are apparent to those skilled in the art. Such changes and modifications are to be understood as included within the scope of the present invention as defined by the appended claims unless they depart therefrom. Therefore, the described exemplary embodiments are to be considered in all respects only as illustrative and not restrictive of the scope of the invention.

When wireless LAN STAs operate in a DCF mode, the present invention reduces the possibility of collision during broadcast or multicast frame transmission while adopting existing CSMA/CA mechanism, thereby improving reliability in successful frame transmission.

What is claimed is:

1. A wireless communication method comprising sending or receiving a predetermined frame through contention between an access point and at least one station according to a distributed coordination function (DCF), wherein the access point uses a short interframe space (SIFS) interval or a point coordination function interframe space (PIFS) interval for access to a wireless medium, wherein the frame is at least one of a broadcast frame and a multicast frame, and wherein the access point transmits a self Clear-To-Send (CTS) immediately after a backoff period and transmits the predetermined frame immediately following the SIFS interval or the PIFS interval which is immediately after the self CTS.

2. The method of claim 1, wherein the predetermined frame sent or received by the access point has at least two destinations.

3. The method of claim 1, wherein the predetermined frame is different from a Request-To-Send (RTS) signal and a Clear-To-Send (CTS) signal.

4. The method of claim 1, wherein the PIFS ensures that the access point has highest priority in sending the predetermined frame before other frames.

5. The method of claim 1, wherein the backoff period is immediately after a DCF InterFrame Space DIFS period that follows a busy medium.

6. The method of claim 1, wherein the self CTS has a format which only has a destination address that is specified to be the address of the access point.

* * * * *